United States Patent
Oyamada (10) Patent No.: US 7,698,908 B2
(45) Date of Patent: Apr. 20, 2010

(54) METHOD OF MANUFACTURING A GLASS BASED MATERIAL WITH DEFECT REMOVAL

(75) Inventor: Hiroshi Oyamada, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 674 days.

(21) Appl. No.: 11/012,345

(22) Filed: Dec. 16, 2004

(65) Prior Publication Data

US 2005/0123256 A1 Jun. 9, 2005

Related U.S. Application Data

(62) Division of application No. 10/116,744, filed on Apr. 5, 2002, now Pat. No. 7,035,514.

(30) Foreign Application Priority Data

Apr. 6, 2001 (JP) .............................. 2001-108941

(51) Int. Cl.
C03B 37/018 (2006.01)
(52) U.S. Cl. ............................. 65/378; 65/382; 65/485; 65/491; 65/422; 65/433
(58) Field of Classification Search ................. 65/378, 65/377, 413, 382, 485, 491, 433, 422
See application file for complete search history.

(56) References Cited

U.S. PATENT DOCUMENTS

| | | | |
|---|---|---|---|
| 3,865,564 A * | 2/1975 | Jaeger et al. ................. 65/392 |
| 4,936,675 A * | 6/1990 | Stevenson ................... 356/73.1 |
| 5,191,206 A | 3/1993 | Boiarski et al. |
| 5,221,309 A * | 6/1993 | Kyoto et al. ................... 65/416 |
| 5,558,692 A * | 9/1996 | Chervenak et al. ............ 65/382 |
| 6,131,414 A * | 10/2000 | Shimizu et al. ............... 65/378 |
| 6,614,512 B1 | 9/2003 | Sakamoto et al. |
| 6,717,659 B2 | 4/2004 | Huang et al. |
| 7,069,748 B2 * | 7/2006 | Uchiyama et al. ............. 65/378 |
| 2002/0069674 A1 * | 6/2002 | Guy et al. ..................... 65/377 |
| 2003/0030786 A1 | 2/2003 | Shurgalin et al. |

FOREIGN PATENT DOCUMENTS

| | | |
|---|---|---|
| DE | 3625731 | 2/1988 |
| JP | 52-121335 | 10/1977 |

(Continued)

OTHER PUBLICATIONS

Hartog A. A. et al, "On the Theory of Backscattering in Single-Mode Optical Fibers", Journal of Lightwave Technology USA, vol. LT-2, No. 2, Apr. 1984, pp. 76-82, XP002425410, ISSN: 0733-8724.

(Continued)

*Primary Examiner*—John Hoffmann
(74) *Attorney, Agent, or Firm*—Hogan & Hartson LLP (57) ABSTRACT

A glass base material, which is a base material of an optical fiber, comprising: a core; and a clad surrounding the core; wherein: a rate of change in a relative-refractive-index-difference between the core and the clad in a longitudinal direction of the glass base material is substantially 6% or less.

5 Claims, 11 Drawing Sheets

FOREIGN PATENT DOCUMENTS

| | | |
|---|---|---|
| JP | 52121335 | 10/1977 |
| JP | 59-217642 | 12/1984 |
| JP | 59217642 | 12/1984 |
| JP | 01 100034 | 4/1989 |
| JP | 1-100034 | 4/1989 |
| JP | 2-212328 | 8/1990 |
| JP | 02 212328 | 8/1990 |
| JP | 2000-281379 | 10/2000 |
| JP | 2000 281379 | 10/2000 |
| JP | 3207323 | 9/2001 |
| WO | 99/32413 | 7/1999 |
| WO | WO 99/32413 | 7/1999 |

OTHER PUBLICATIONS

Ohashi M. et al, "Novel Technique for Measuring Longitudinal Chromatic Dispersion Distribution in Singlemode Fibres", Electronics Letters, IEE Stevenage, GB, vol. 29, No. 5, Mar. 4, 1993, pp. 426-428, XP000349845, ISSN: 0013+5194.

Gold M. P. et al, "Analysis of Backscatter Waveforms From Single-Mode Fibres", European Conference on Optical Communication Conference Europeenne Sur Les Communications Optiques Paris, France, 1982, pp. 633-638, XP008076495.

"Explanation of Anomalous Loss in High Delta Singlemode Fibres" Lines, M.E.; Reed, W.A.; Di Giovanni, D.J.; Hamblin, J.R., Electronics Letters, vol. 35, Issue 12, Jun. 10, 1999, pp. 1009-1010.

EP 02090 133.6 Examination Report; Mar. 23, 2007.

EP 05090192.5 Partial European Search Report; Apr. 2, 2007.

EP 05090193.3 European Search Report; Apr. 16, 2007.

Hartog, et al. "On the Theory of Backscattering in Single-Mode Optical Fibers"; Journal of Lightwave Technology; Apr. 1984; pp. 76-82; vol. LT-2, No. 2; IEEE.

Ohashi, et al. "Novel Technique for Measuring Longitudinal Chromatic Dispersion Distribution in Singlemode Fibres"; Electronic Letters; Mar. 4, 1993; pp. 426-428; vol. 29, No. 5.

Gold, et al. "Analysis of backscatter waveforms from single-mode fibres"; Session C Conference Poster Papers (III); pp. 633-638, 1982.

Lines, et al. "Explanation of anomalous loss in high delta singlemode fibres"; Electronic Letters; Jun. 10, 1999; vol. 35, No. 12; IEEE 1999.

Nakajima, et al. "Longitudinal dispersion evaluation in a 120km long installed submarine cable using a bi-directional OT DR technique"; Electronics Letters; Feb. 19, 1998; vol. 34, No. 4; pp. 386-388; IEEE.

Ishikura, et al. "Loss Factors Analysis for Single-Mode Fiber Splicing Without Core Axis Alignment"; Journal of Lightwave Technology; Apr. 1989; pp. 577-583; vol. 7, No. 4; IEEE.

\* cited by examiner

METHOD OF MANUFACTURING A GLASS BASED MATERIAL WITH DEFECT REMOVAL

CROSS REFERENCE TO RELATED APPLICATIONS

This application is a division of Ser. No. 10/116,744, filed Apr. 5, 2002, now U.S. Pat. No. 7,035,514 which claims priority to Japanese Patent Appl. No. 2001-108941, filed Apr. 6, 2001.

This patent application claims priority from a Japanese patent application, No. 2001-108941 filed on Apr. 6, 2001, the contents of which are incorporated herein by reference.

BACKGROUND OF THE INVENTION

1. Field of the Invention

The present invention relates to a glass base material, single mode optical fiber, a method for manufacturing thereof, and a method for detecting a defect thereof. More particularly, the present invention relates to a glass base material, single mode optical fiber, a method for manufacturing thereof, and a method for determining a cause of defect thereof by which a part of an optical fiber that causes a transmission loss can be easily specified.

2. Description of the Related Art

As one of the methods to measure a transmission loss in an optical fiber, there is a cutback method. The cutback method inputs a light having a predetermined wavelength into one end of an optical fiber and measures a power of light that exits from the other end of the optical fiber. Next, an incident side of the end of the optical fiber is cut for substantially 2 m.

Then, a light having a predetermined wavelength is input into one end of an optical fiber, which is about 2 m in length, and a power of light that exits from the other end is measured again. A difference between the two powers of lights is calculated. The difference of the two powers of lights is a transmission loss occurring in the remaining optical fiber, the power of light that traveling through which is not measured.

The cutback method can accurately measure an average transmission loss for the whole length of the optical fiber. However, it is difficult to measure a distribution of a transmission loss in the longitudinal direction of the optical fiber by the cutback method. The cutback method has the following disadvantage. In a case where the transmission loss is high, the cutback method cannot obtain the information whether the transmission loss is high over the whole length of the optical fiber or the transmission loss is high only on a part of the optical fiber. Also, the cutback method cannot detect the location of the part having a high transmission loss in the optical fiber.

As another method for obtaining the information of transmission loss in the longitudinal direction of the optical fiber, there is an OTDR (Optical Time Domain Reflectometer) method. The OTDR method measures a transmission loss in the optical fiber by inputting a pulse light having a predetermined wavelength from one end of the optical fiber. The OTDR method then measures a Rayleigh-scattering-light, which is returned from a position of z of the optical fiber to one end of the optical fiber, to which the pulse light is input. The "z" is a distance from the incident end plane of the optical fiber. Hereinafter, the Rayleigh-scattering-light is referred to as a backscattering light.

The strength of the backscattering light $P(\lambda, Z)$ is calculated by the following equation (1).

$$P(\lambda,z)=P_0 \cdot \alpha(\lambda,z) \cdot B(\lambda,z)\exp\{-2\int_0^z \gamma(x)dx\} \quad (1)$$

$P_0$: strength of a propagation light at an incident end (z=0)
$\alpha$: Rayleigh-scattering-coefficient.
$B$: backscattering-light-collect-coefficient
$\gamma$: local transmission loss.

When the equation (1) is transformed using a logarithmic value and is expressed by a dB scale, the equation (1) is transformed into an equation (2).

$$S(\lambda, z) = 10 \log \sqrt{P(\lambda, z)} \quad (2)$$
$$= 5 \log P_0 \cdot \alpha(\lambda) + 5 \log B(\lambda, z) - 10 (\log e) \int_0^1 \gamma(x)dx$$

Figure 2:
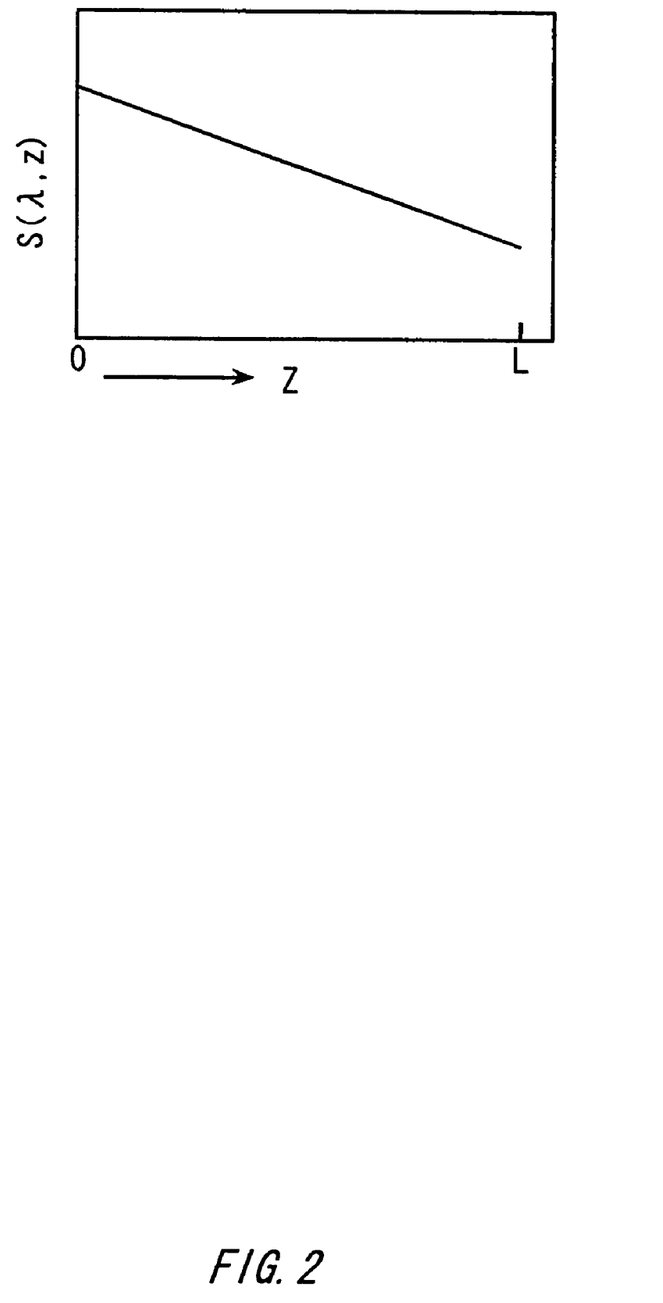
FIG. 2 shows the detailed procedure of the OTDR measurement method.

As shown in FIG. (2), the backscattering-light-strength $S(\lambda, z)$ changes according to the position "z" in the longitudinal direction of the optical fiber. Here, the Rayleigh scattering coefficient $\alpha$ is assumed to be substantially constant along the longitudinal direction of the optical fiber when the transmission loss in the longitudinal direction of the optical fiber is relatively stable.

Figure 1:
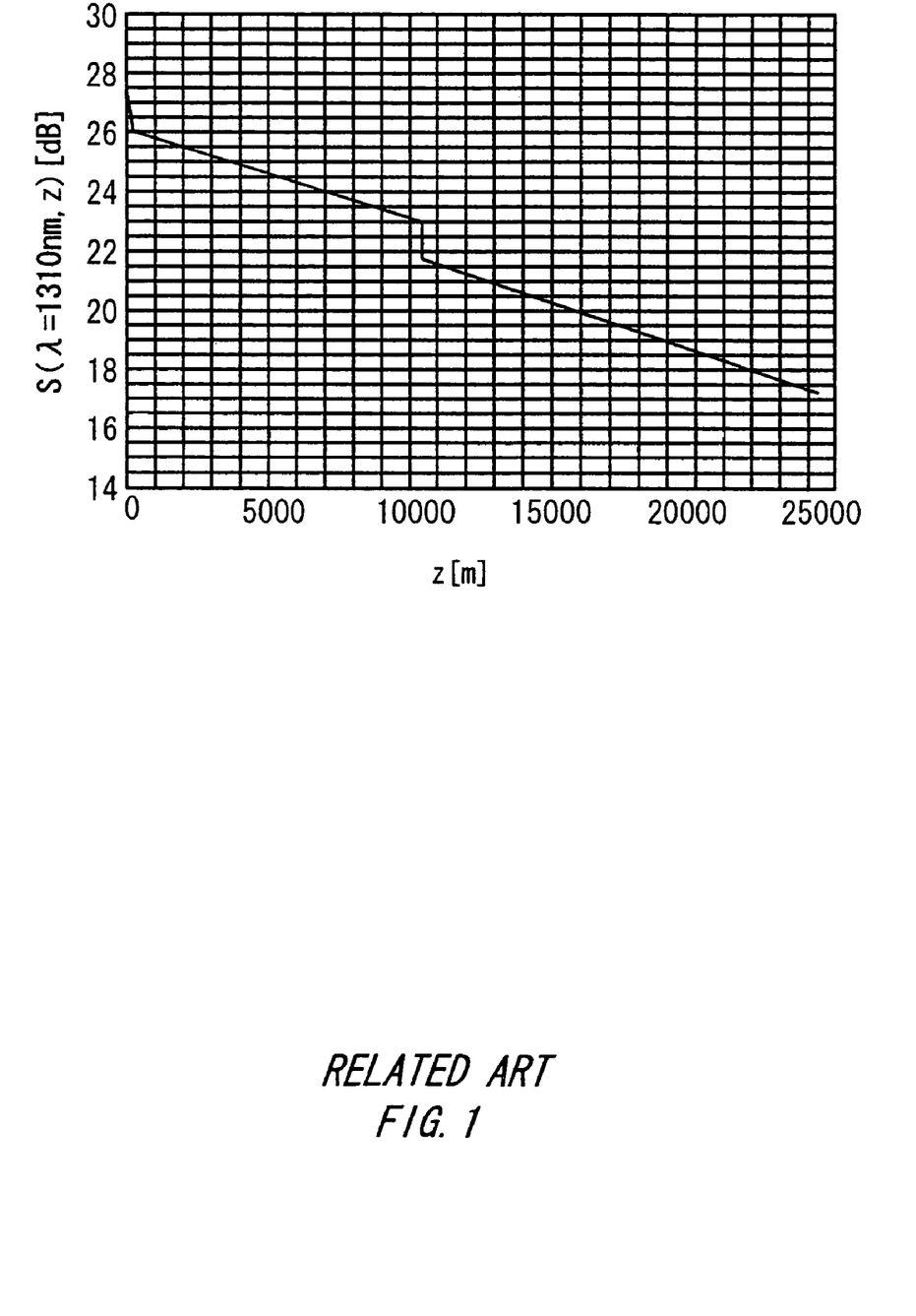
FIG. 1 shows an example of a result of typical OTDR measurement.

FIG. 1 shows an example of a result of typical OTDR measurement. A part, where the backscattering-light-strength $S(\lambda, z)$ simply decreases, indicates that the characteristic of the transmission loss is stable. The abrupt change in the inclination of the line around z=10,000 m indicates that the abrupt increase in the transmission loss occurs at the position z=10,000 m.

As a cause of the abrupt increase in the transmission loss, such as a macro bending loss, which occurs when the optical fiber is bent by stress applied on the optical fiber. The transmission loss may abruptly increase when there is a defect in the connection between two optical fibers. The region having a high transmission loss is not desirable for transmitting a light signal. It is necessary to re-lay or re-connect the optical fiber in the region having a high transmission loss.

It is difficult to accurately measure the transmission loss by the OTDR method if only one side of the backscattering light, which is input to one side of the end of the optical fiber and returned to this side of the end of the optical fiber, is measured. Hereinafter, the measurement of the transmission loss by the OTDR method is referred to as OTDR measurement.

As made clear from the equation (1), the factor, which influences the strength of the backscattering light, is not limited to the transmission loss $\gamma(z)$. The fluctuation in the backscattering-light-collect-coefficient $B(z)$ also influences the strength of the backscattering light. Thus, the waveform of the light that propagates through the optical fiber fluctuates when the backscattering-light-collect-coefficient $B(z)$ fluctuates.

In order to measure a transmission loss accurately, the backscattering light is measured from both ends of the optical fiber. Therefore, one backscattering-light-strength $S_1(\lambda, z)$ is measured from one end of the optical fiber, and another backscattering-light-strength $S_2(\lambda, z-L)$ is measured from another end of the optical fiber. Thus, the values of the backscattering-light-strength $S_1(\lambda, z)$ and $S_2(\lambda, z-L)$ shown in the following equations (3) and (4) are obtained.

$$S_1(\lambda,z)=5 \log P_{01} \cdot \alpha(\lambda)+5 \log B(\lambda,z)-10(\log e)\int_0^z \gamma(x)dx \quad (3)$$

$$S_2(\lambda,z-L)=-5 \log P_{02} \cdot \alpha(\lambda)-5 \log B(\lambda,z)+10(\log e)\int_0^z \gamma(x)dx \quad (4)$$

Then, a value of D(z) is obtained by the following equation (5). As shown in equation (5), the factor of the backscattering-light-collect-coefficient $B(z)$ is canceled out by adding the values of the backscattering-light-strengths $S_1(\lambda, z)$ and $S_2(\lambda, z-L)$. Therefore, only the component of the transmission loss $\gamma$ remains in equation (5).

$$D(z) = \{S_1(\lambda, z) + S_2(\lambda, z-L)\}/2 \qquad (5)$$
$$= const. - 10(\log e) \int_0^z \gamma(z) dx$$

If the optical fiber is in a condition where the optical fiber is wound around a bobbin right after the manufacture of the optical fiber, it is possible to perform OTDR measurement from both ends of the optical fiber. However, it is extremely difficult to perform OTDR measurement from both ends of the optical fiber if the optical fiber is formed into cable and is laid linearly for more than 10 kilometers.

Hence, in the actual construction site, it was difficult to specify the part, in which the transmission loss is occurred, by measuring the backscattering-light-strength $S(\lambda, z)$ from only one end of the optical fiber. If the backscattering-light-strength $S(\lambda, z)$ is measured from only one end, the part having a large backscattering-light-collect-coefficient $B(z)$ may be mistakenly considered as the part in which the transmission loss is occurred.

Thus, if there is a part having a large backscattering-light-collect-coefficient $B(z)$ in the optical fiber, this part may be mistakenly considered to have a high transmission loss even if the transmission loss is actually low in this part.

SUMMARY OF THE INVENTION

Therefore, it is an object of the present invention to provide an optical fiber capable of easily specifying a part with a problem of transmission loss by OTDR measurement from only one end of an optical fiber and to provide an optical fiber base material to manufacture such a fiber and an evaluation method thereof.

According to a first aspect of the present invention, a glass base material, which is a base material of an optical fiber, comprises a core; and a clad surrounding the core; wherein a rate of change in a relative-refractive-index-difference between the core and the clad in a longitudinal direction of the glass base material is substantially 6% or less.

According to a second aspect of the present invention, an optical fiber comprises a core; and a clad surrounding the core; wherein a rate of change in a relative-refractive-index-difference between the core and the clad in a longitudinal direction of the optical fiber is substantially 6% or less.

According to a third aspect of the present invention, an optical fiber comprises a core; and a clad surrounding the core; wherein an absolute value of an amount of change in a backscattering-light-collect-coefficient $|I(\lambda, z)|$ in a longitudinal direction of the optical fiber is substantially 0.1 dB or less.

The optical fiber may have a region, which satisfies a relation of $|I(\lambda_1, z)| < |I(\lambda_2, z)| \leq 0.1$ dB at least in a part of a longitudinal direction of the optical fiber where $I(\lambda_1, z)$ and $I(\lambda_2, z)$ are the amounts of change in a backscattering-light-collect-coefficient $|I(\lambda, z)|$ for two wavelengths $\lambda_1$ and $\lambda_2$, where $\lambda_1 < \lambda_2$.

The optical fiber may have a region, which satisfies a relation of $I(\lambda_1, z) = 0.8 \times I(\lambda_2, z)$, at least in a part of longitudinal direction of the optical fiber when the two wavelengths $\lambda_1$ and $\lambda_2$ are substantially 1310 nm and 1550 nm, respectively.

According to a fourth aspect of the present invention, a glass base material, which is a base material of an optical fiber, comprises a core; and a clad surrounding the core; wherein a rate of change in a diameter of the core in a longitudinal direction of the glass base material is substantially 7% or less.

According to a fifth aspect of the present invention, an optical fiber comprises a core; and a clad surrounding the core; wherein a rate of change in a diameter of the core in a longitudinal direction of the optical fiber is substantially 7% or less.

According to a sixth aspect of the present invention, an optical fiber comprises a core; and a clad surrounding the core; wherein an amount of change in a backscattering-light-collect-coefficient in a longitudinal direction of the optical fiber is substantially 0.1 dB or less.

The optical fiber may have a region, which satisfies a relation of $|I(\lambda_2, z)| < |I(\lambda_1, z)| \leq 0.1$ dB at least in a part of a longitudinal direction of the optical fiber where $I(\lambda_1, z)$ and $I(\lambda_2, z)$ are the amounts of change in a backscattering-light-collect-coefficient $I(\lambda, z)$ for two wavelengths $\lambda_1$ and $\lambda_2$, where $\lambda_1 < \lambda_2$.

The optical fiber may have a region, which satisfies a relation of $I(\lambda_1, z) = 2 \times I(\lambda_2, z)$, at least in a part of a longitudinal direction of the optical fiber when the two wavelengths $\lambda_1$ and $\lambda_2$ are substantially 1310 nm and 1550 nm, respectively.

According to a seventh aspect of the present invention, a method for determining a cause of defect in an unused optical fiber comprises measuring backscattering-light-strengths $S(\lambda_1, z)$ and $S(\lambda_2, z)$ of the optical fiber for two wavelengths $\lambda_1$ and $\lambda_2$, where $\lambda_1 < \lambda_2$ from both ends of the optical fiber; calculating an amount of change in a backscattering-light-collect-coefficient $I(\lambda_2, z)$ and $I(\lambda_1, z)$ for the two wavelength $\lambda_1$ and $\lambda_2$; comparing the amount of change in a backscattering-light-collect-coefficient $I(\lambda_1, z)$ and $I(\lambda_2, z)$ for the two wavelengths $\lambda_1$ and $\lambda_2$ to examine whether the amount of change in a backscattering-light-collect-coefficient $I(\lambda_1, z)$ and $I(\lambda_2, z)$ satisfy a predetermined relationship; and determining the cause of defect in the optical fiber according to the comparison.

The comparing may examine whether the amount of change in a backscattering-light-collect-coefficient $I(\lambda_1, z)$ and $I(\lambda_2, z)$ satisfy a relationship of $|I(\lambda_1, z)| > 0.1$ dB, $|I(\lambda_2, z)| > 0.1$ dB, and $|I(\lambda_1, z)| < |I(\lambda_2, z)|$ in the optical fiber; and the determining may determine that the cause of defect is in a rate of change in a relative-refractive-index-difference of the optical fiber in a longitudinal direction when the relationships are satisfied.

The comparing may examine whether the amount of change in a backscattering-light-collect-coefficient $I(\lambda_2, z)$ and $I(\lambda_1, z)$ satisfy a relationships of $|I(\lambda_1, z)| > 0.1$ dB, $|I(\lambda_2, z)| > 0.1$ dB, and $|I(\lambda_1, z)| > |I(\lambda_2, z)|$ in the optical fiber; and the determining may determine that the cause of defect is in a rate of change in a core diameter of the optical fiber in longitudinal direction when the relationships are satisfied.

According to a eighth aspect of the present invention, a method for manufacturing a glass base material, which is a base material of an optical fiber, comprises forming a clad around a core by accumulating glass particles on the core to form a porous-glass-base-material; sintering and dehydrating the porous-glass-base-material to form the glass base material; measuring a rate of change in a relative-refractive-index-difference between the core and the clad in a longitudinal direction of the glass base material; and removing the glass base material, the rate of change in a relative-refractive-index-difference of which is more than substantially 6%.

According to a ninth aspect of the present invention, a method for manufacturing an optical fiber comprises drawing a glass base material, which is a base material of the optical fiber having a core and a clad that surrounds the core, to form the optical fiber; measuring a rate of change in a relative-refractive-index-difference between the core and the clad in a longitudinal direction of the optical fiber; and removing a part of the optical fiber, the rate of change in a relative-refractive-index-difference of which is more than substantially 6%.

According to a tenth aspect of the present invention, a method for manufacturing a glass base material, which is a base material of an optical fiber, comprises forming a clad around a core by accumulating glass particles on the core to form a porous-glass-base-material; sintering and dehydrating the porous-glass-base-material to form the glass base material; measuring a rate of change in a diameter of the core in a longitudinal direction of the glass base material; and removing the glass base material, the rate of change in the diameter of the core of which is more than substantially 7%.

According to a eleventh aspect of the present invention, a method for manufacturing an optical fiber comprises drawing a glass base material, which is a base material of the optical fiber having a core and a clad that surrounds the core, to form the optical fiber; measuring a rate of change in a core diameter in a longitudinal direction of the optical fiber; and removing a part of the optical fiber, the rate of change in the core diameter of which is more than substantially 7%.

According to a twelveth aspect of the present invention, a method for manufacturing an optical fiber comprises drawing a glass base material, which is a base material of the optical fiber having a core and a clad that surrounds the core, to form the optical fiber; measuring an amount of change in a backscattering-light-collect-coefficient in a longitudinal direction of the optical fiber; removing the optical fiber, in which an absolute value of the amount of change in a backscattering-light-collect-coefficient $|I(\lambda, z)|$ is more than substantially 0.1 dB.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

The invention will now be described based on preferred embodiments, which do not intend to limit the scope of the present invention, but rather to exemplify the invention. All of the features and the combinations thereof described in the embodiments are not necessarily essential to the invention.

As one of the factors of the problem on the transmission loss of the optical fiber, there is a macro bending loss. This macro bending loss is a phenomenon, in which a part of the light that propagates in the optical fiber escapes from the optical fiber when the optical fiber is bent with an order between 1 mm and 100 mm. This phenomenon of the macro bending loss is observed as a transmission loss.

The degree of the transmission loss caused by the macro bending loss is different according to the condition of the distribution of the refractive index of the optical fiber or the magnitude of the bending.

Generally, there is a tendency such that the more the dend radius of the bent section of the optical fiber decreases, the more the degree of the transmission loss of the macro bending loss increases. Also, the more the length of the bent section increases, the more the degree of the transmission loss of the macro bending loss increases. Furthermore, the more the cutoff wavelength decreases, the more the degree of the transmission loss of the macro bending loss increases. Furthermore, the more the mode field diameter increases, the more the degree of the transmission loss of the macro bending loss increases. Also, the more the transmission wavelength increases, the more the degree of the transmission loss of the macro bending loss increases.

It is required that the micro bending loss against the bending of a diameter of 32 mmφ for one lap should be 1 dB or less according to G.652 of ITU-T (Telecommunication standardization sector of international telecommunication union), which is an international standard.

Another factor of the problem on the transmission loss of the optical fiber is a connection loss. The connection loss occurs when the overlapped two power distribution of the light in two optical fibers are not matched with each other at the connection point of two optical fibers. One of the causes of the connection loss is a gap created between two-core axes of two optical fibers at the connection point of two optical fibers.

For example, in a case of a typical single mode optical fiber having a step type refractive index distribution and a mode field diameter (MFD) of 9.2 μm, the connection loss of 0.2 dB occurs when two core axes of two optical fibers are connected with a gap of 1 μm.

In the present invention, the optical fiber itself is made so that a part of the optical fiber having a transmission loss more than substantially 0.1 dB can be easily detected by measuring the incidental light of one end using the OTDR measurement method.

FIGS. 2 to 4E show the detailed procedure of the OTDR measurement method. In FIGS. 2 to 4B, the vertical axis indicates a backscattering-light-strength $S(\lambda, z)$, and the horizontal axis indicates a distance "z" from an incident end face of the optical fiber. "L" is a length of the optical fiber. In FIG. 4C, the vertical axis indicates a D(z) calculated by the equation (11). The vertical axis of FIG. 4D indicates I(λ, z), which is an amount of change in a backscattering-light-collect-coefficient B(z). The vertical axis of FIG. 4E indicates a value of MFD.

As shown in FIG. 2, the backscattering-light-strength S(λ, z) decreases linearly in the longitudinal direction of the optical fiber when the transmission loss is constant over the whole length of the optical fiber.

Figure 3A:
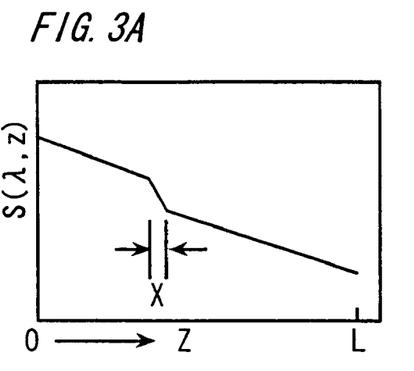
FIGS. 3A-3C show the change of the backscattering-light-strength $S(\lambda, z)$ along the longitudinal direction of the optical fiber.
Figure 3B:
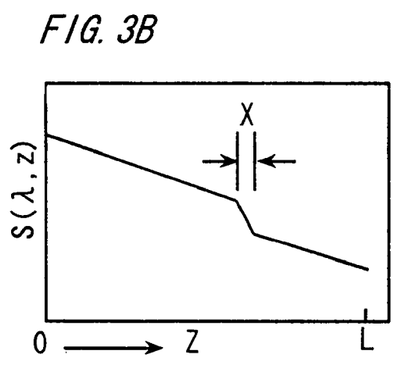

FIGS. 3A and 3B show the change of the backscattering-light-strength S(λ, z) along the longitudinal direction of the optical fiber when there is a part that has high transmission loss in the optical fiber. Here, FIG. 3A shows the backscattering-light-strength S(λ, z), which is measured from one end of the optical fiber. On the other hand, FIG. 3B shows the backscattering-light-strength S(λ, z), which is measured from another end of the optical fiber.

Figure 3C:
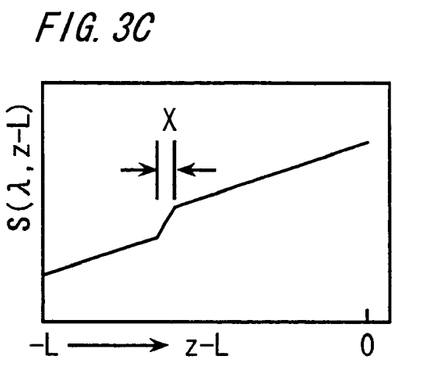

FIG. 3C shows the backscattering-light-strength S(λ, z−L), which is obtained by reversing FIG. 3B in the horizontal direction. For example, the distance "z" of "0" is on the left hand side in FIG. 3B, and it becomes the right hand side in FIG. 3C. Also, the distance "z" of "L" is on the right hand side in FIG. 3B, and it becomes the left hand side in FIG. 3C.

Figure 3D:
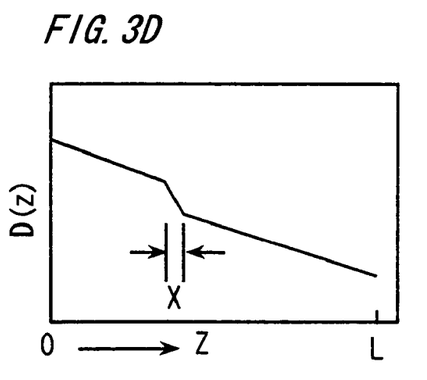
FIG. 3D shows a value of $D(z)$, which changes in a longitudinal direction of the optical fiber.

FIG. 3D shows a value of D(z), which changes in a longitudinal direction of the optical fiber. The value of D(z) is calculated by the above-mentioned equation (5) from the values of the backscattering-light-strengths S(λ,z) and S(λ, z−L) shown in FIGS. 3A and 3C. In FIG. 3D, the inclination of D(z) increases greatly at the part marked by "X". Therefore, the part having a high transmission loss, which is marked by "X", can be detected.

Figure 4A:
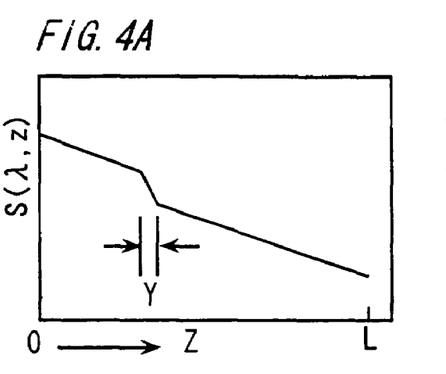
FIGS. 4A and 4B show the backscattering-light-strength $S(\lambda, z)$, which is measured from one end of the optical fiber.
Figure 4B:
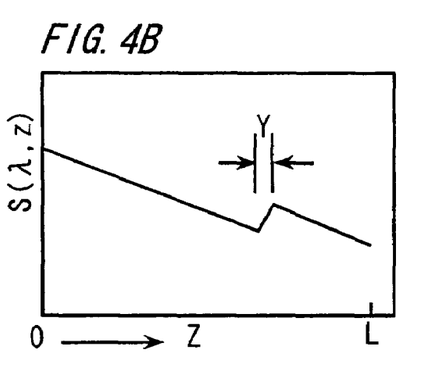

FIGS. 4A and 4B show the backscattering-light-strengths S(λ, z) along a longitudinal direction of the optical fiber when there is a part, in which the backscattering-light-collect-coefficient B changes. Here, FIG. 4A shows the backscattering-light-strength S(λ, z), which is measured from one end of the optical fiber. FIG. 4B shows the backscattering-light-strength S(λ, z), which is measured from another end of the optical fiber.

In FIGS. 4A and 4B, the inclination of the change in the backscattering-light-strength S(λ, z) changes at the part marked by "Y". Furthermore, the direction of the inclination of the change in the backscattering-light-strength S(λ, z) is different between FIGS. 4A and 4B. For example, in FIG. 4A, the backscattering-light-strength S(λ, z) decreases at the part marked by "Y". In contrast, in FIG. 4B, backscattering-light-strength S(λ, z) increases at the part marked by "Y".

Figure 4C:
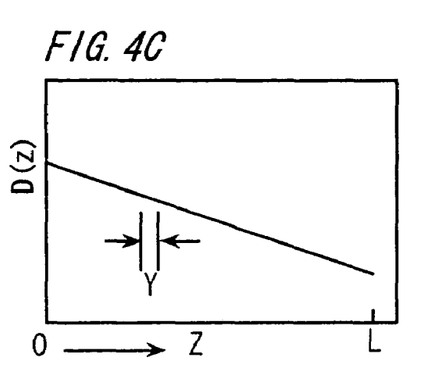
FIG. 4C shows a $D(z)$ calculated by the equation (11).

FIG. 4C shows the change in D(z) along the longitudinal direction of the optical fiber. FIG. 4C is calculated from the values in FIGS. 4A and 4B using the same method as explained in FIGS. 3A to 3D. As shown in FIG. 4C, the change in the backscattering-light-strength S(λ, z) at the part marked by "Y" is canceled out. Thus, the backscattering-light-strength S(λ,z) decreases linearly for the whole length of the optical fiber. Therefore, as clearly shown in FIG. 4C, the transmission loss is not changed at the part marked by "Y". Thus, it is understood that the cause of the change in the inclination of the backscattering-light-strength S(λ, z) is not a transmission loss but a change in the backscattering-light-collect-coefficient B.

Figure 4D:
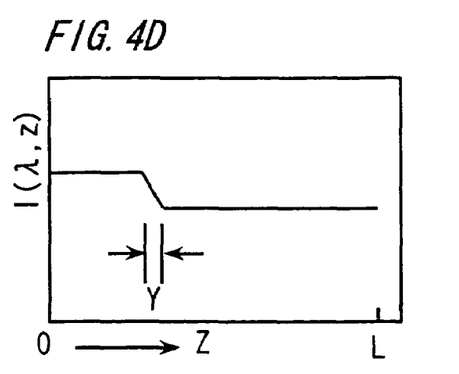
FIG. 4D shows an amount of change in the backscattering-light-collect-coefficient $I(\lambda, z)$

FIG. 4D shows an amount of change in the backscattering-light-collect-coefficient I(λ, z). The amount of change in the backscattering-light-collect-coefficient I(λ, z) is calculated by the following equation (6).

$$I(\lambda, z) = \{S_1(\lambda, z) - S_2(\lambda, z-L)\}/2 \quad (6)$$
$$= const. + 5 \log B(\lambda, z)$$

Also, the backscattering-light-collect-coefficient B is calculated by the following equation (7).

$$B = \{3/[4k^2 a^2 \Delta n^2]\} \times \{[\int_0^\infty \phi^4(r) r \, dr]/[\int_0^\infty \phi^2(r) r \, dr]^2\} \quad (7)$$

k: constant determined by a wavelength of propagated light
a: core diameter
Δn: refractive index difference of an optical fiber
φ: electrical field distribution of propagated light
r: distance or radius from a center of an optical fiber The cause of the fluctuation in the backscattering-light-collect-coefficient B is the fluctuation in mode field diameter (MFD). There is a relationship of $B \propto [MFD]^{-2}$ between the backscattering-light-collect-coefficient B and the MFD.

Figure 4E:
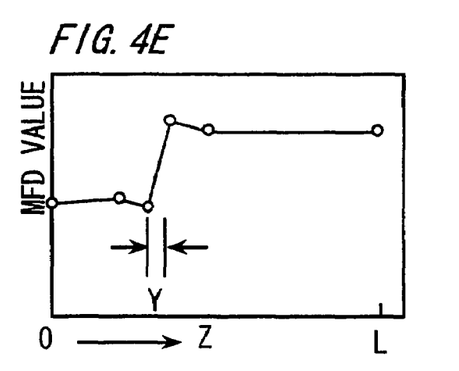
FIG. 4E shows an MFD measured along the longitudinal direction of the optical fiber.

FIG. 4E shows an MFD measured along the longitudinal direction of the optical fiber. An MFD is measured by cutting an optical fiber along a longitudinal direction. It can be understood from FIGS. 4D and 4E that the cause of the fluctuation in the I(λ, z) is the fluctuation in the MFD value because when the MFD value abruptly changes at the part marked by "Y", the value of the I(λ, z) also abruptly changes at the part marked by "Y".

From a different point of view, if the fluctuation of the MFD in the longitudinal direction of the optical fiber is reduced, the fluctuation in the backscattering-light-collect-coefficient B in the longitudinal direction of the optical fiber is also reduced. Thus, by reducing the fluctuation in the MFD in the optical fiber to reduce the fluctuation in the backscattering-light-collect-coefficient B, the transmission loss in the optical fiber can be detected by measuring the backscattering-light-strength S(λ, z) from only one end of the optical fiber. Therefore, it is possible to detect the part having a high transmission loss in the optical fiber by the OTDR measurement that measures the backscattering light from only one end of the optical fiber.

There are two causes of the fluctuation in MFD. One of the causes is a fluctuation in a relative-refractive-index-difference Δn. The Δn is calculated by the following equation.

$$\Delta n = \{(n_1 - n_2)/n_1\} \times 100[\%] \quad (8)$$

$n_1$: refractive index of core
$n_2$: refractive index of clad

Another cause is a fluctuation in a diameter of a core of an optical fiber.

A glass base material having a diameter between 10-200 millimeters was manufactured. Then, an optical fiber having a diameter of 120 μm is manufactured by heating and softening the glass base material and drawing the softened glass base material.

The refractive index distribution of the glass base material is adjusted so as to have a similar shape with that of the optical fiber. The fluctuation of each parameter explained above, such as relative-refractive-index-difference Δn and a diameter of a core of an optical fiber, may occur in the phase of manufacturing the glass base material. The fluctuation of each parameter explained above may also occur in the phase of drawing the glass base material to be an optical fiber.

That is, if the refractive index or the core diameter of a glass base material fluctuates in the phase of manufacturing the glass base material, the refractive index or the core diameter of the optical fiber manufactured from the glass base material also fluctuates almost the same as the glass base material.

Even if the fluctuation of the refractive index or the core diameter is reduced in the phase of manufacturing the glass base material, the refractive index or the core diameter of the optical fiber may fluctuate if a speed of cooling an optical fiber during the drawing process fluctuates.

If the speed of cooling an optical fiber fluctuates during the drawing process, the condition of a residual stress inside the optical fiber changes. Thus, the refractive index distribution of the drawn optical fiber also changes. Furthermore, if the diameter of the optical fiber fluctuates during the drawing process, the core diameter of the drawn optical fiber also changes. It is very difficult to cancel the fluctuation of the refractive index distribution or the core diameter of the optical fiber by controlling the drawing process of the optical fiber if the refractive index distribution or the core diameter of the glass base material fluctuates.

Therefore, in order to manufacture an optical fiber having small fluctuation in the above-mentioned parameters, it is necessary to control the fluctuation of the above-mentioned parameters to a minimum during both the phase of manufacturing the glass base material and drawing the glass base material into the optical fiber.

Furthermore, if a fluctuation of the above-mentioned parameters is recognized in the glass base material by the test, the glass base material is removed from the manufacturing process so that the glass base material having stable values of the above-mentioned parameters is shipped. Furthermore, if a fluctuation of the above-mentioned parameters is recognized in the part of the optical fiber by the test, the fluctuated part of the optical fiber is removed in order to take out only the part of the optical fiber having a stable value of the above-mentioned parameters.

Therefore, how an amount of fluctuation in the above-mentioned parameters, such as refractive index distribution or the core diameter, influences on the fluctuation in the value measured by the OTDR measurement method, such as backscattering-light-strength $S(\lambda, z)$, was researched. Especially, how the fluctuation in the refractive index distribution or the fluctuation in the core diameter influences on the fluctuation in the backscattering-light-collect-coefficient B was researched.

First, a glass base material was formed by a VAD method. The relative-refractive-index-difference $\Delta n$ of the core of the manufactured glass base material was fluctuated from a reference value of relative-refractive-index-difference $\Delta n=0.35\%$ in a longitudinal direction. This glass base material was drawn into an optical fiber having a core diameter of 8 μm. The OTDR measurement is performed on this optical fiber.

Figure 5:
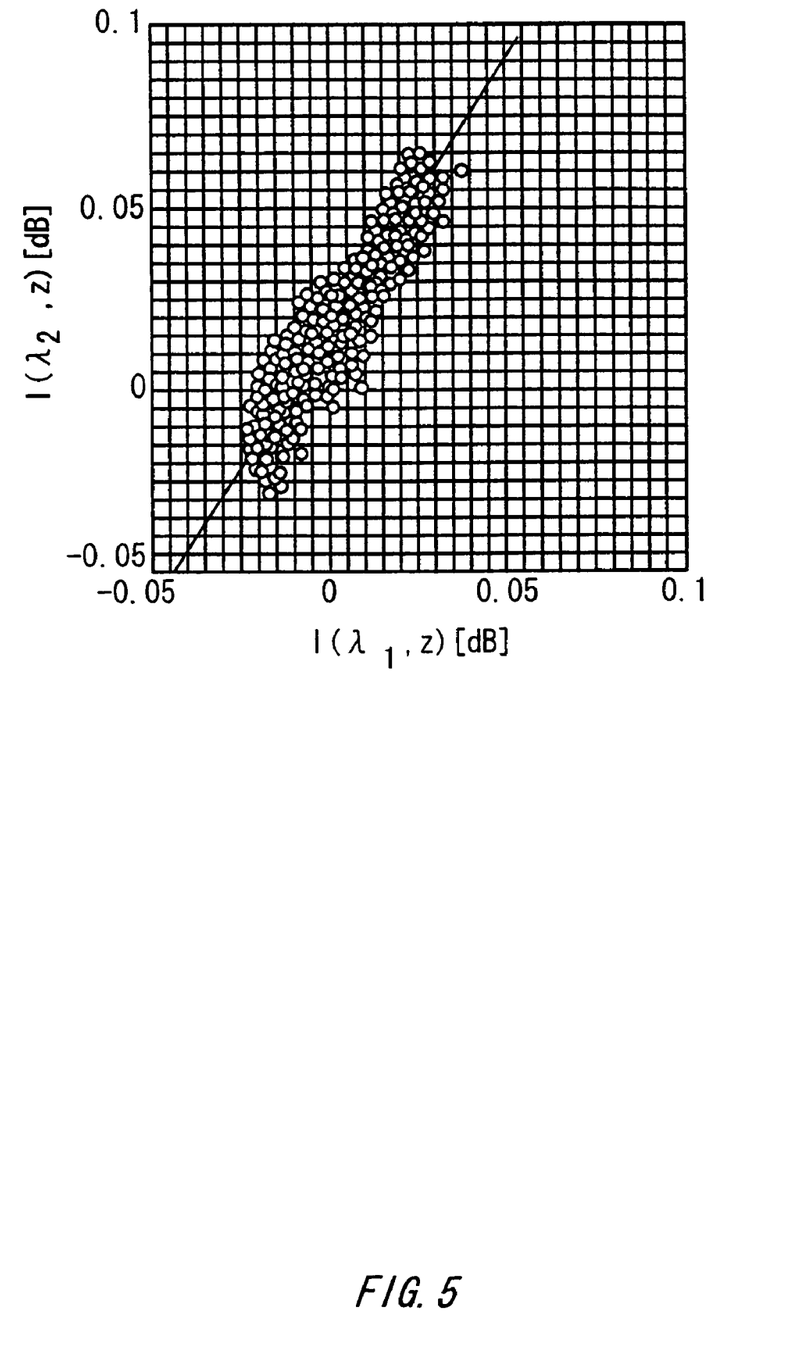
FIG. 5 shows amounts of change in the backscattering-light-collect-coefficients $I(\lambda_1, z)$ and $I(\lambda_2, z)$.
Figure 6:
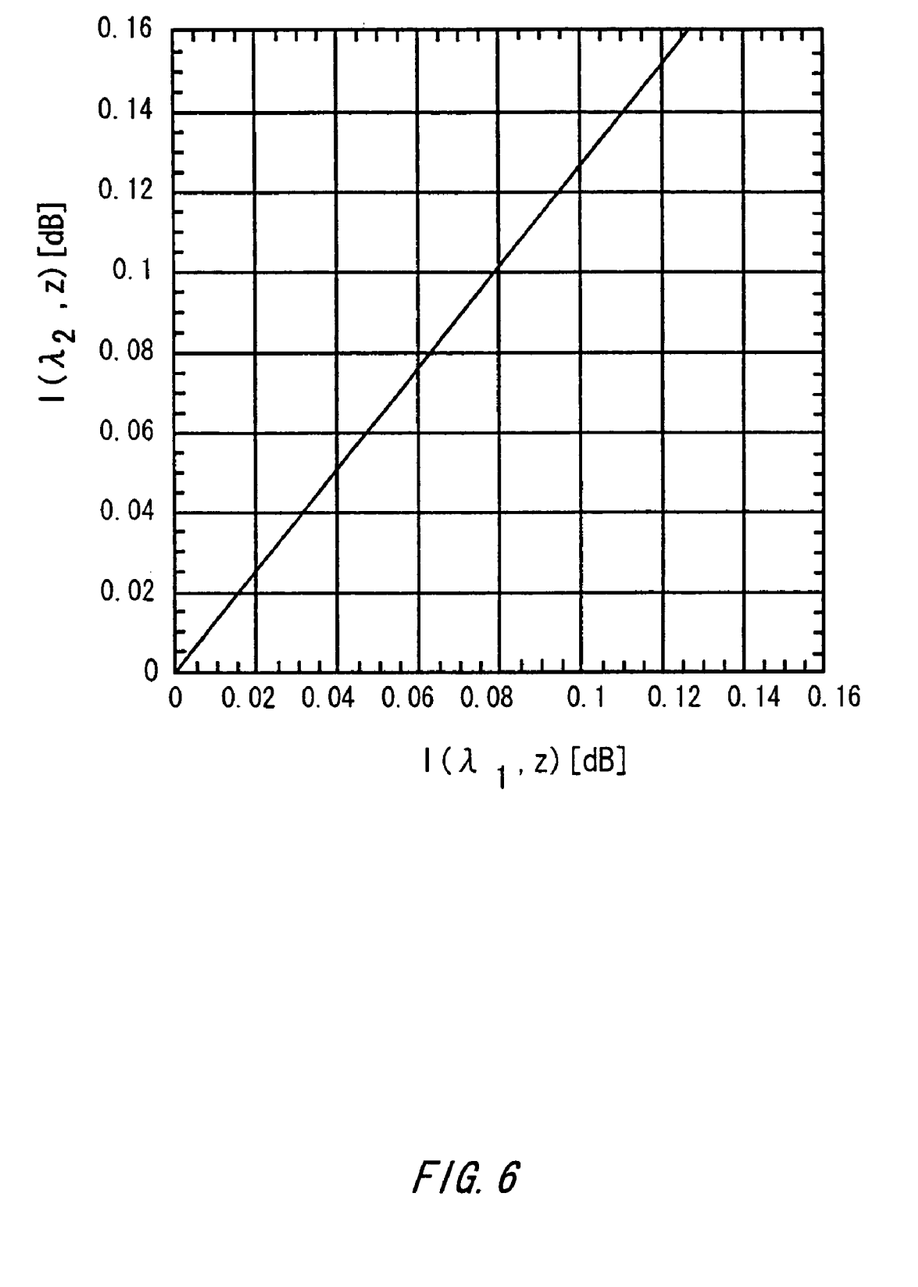
FIG. 6 shows relative values of $I(\lambda_1, z)$ and $I(\lambda_2, z)$.
Figure 7:
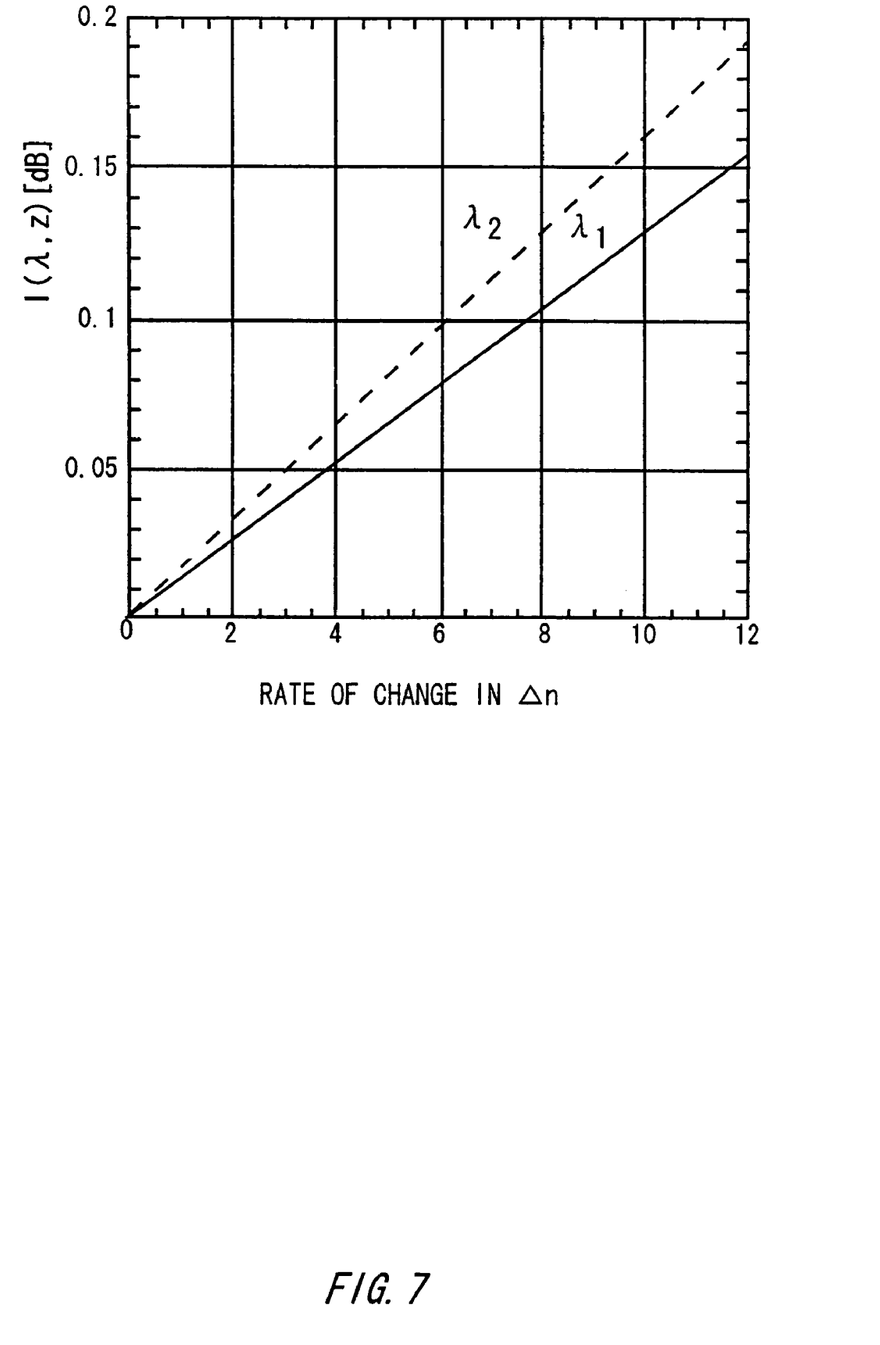
FIG. 7 shows the calculated relative value of $I(\lambda_1, z)$ and $I(\lambda_2, z)$.

FIGS. 5 to 7 show a result of this OTDR measurement on the optical fiber, which is drawn from the glass base material having a fluctuated relative-refractive-index-difference.

FIG. 5 shows amounts of change in the backscattering-light-collect-coefficients $I(\lambda_1, z)$ and $I(\lambda_2, z)$ for two wavelengths $\lambda_1=1310$ nm and $\lambda_2=1550$ nm calculated using the above-mentioned equation (6). The values of $I(\lambda_1, z)$ and $I(\lambda_2, z)$ are calculated for each position of "z" along a longitudinal direction of the optical fiber. Then, the values of $I(\lambda_1, z)$ and $I(\lambda_2, z)$ for each position of "z" are plotted on FIG. 5.

Next, the value of the electrical field distribution $\phi$ of the optical fiber, which had a core diameter of 8 μm, was calculated by computer simulation. During the calculation of the electrical field distribution $\phi$, the relative-refractive-index-difference $\Delta n$ fluctuated slightly from a reference value of the relative-refractive-index-difference $\Delta n=0.35\%$.

Then, the backscattering-light-collect-coefficient B was calculated using the above-mentioned equation (7). Next, the value of $I(\lambda, z)$ is calculated using the equation (6). Finally, an absolute or relative value of $I(\lambda, z)$ is calculated by calculating a difference between the $I(\lambda, z)$, which is calculated using the fluctuated relative-refractive-index-difference $\Delta n$, and the reference $I(\lambda, z)$, which is calculated using the reference value of the relative-refractive-index-difference $\Delta n=0.35\%$.

FIG. 6 shows relative values of $I(\lambda_1, z)$ and $I(\lambda_2, z)$ for $\lambda_1=1310$ nm and $\lambda_2=1550$ nm calculated by the computer simulation. It is clear from FIGS. 5 and 6 that the inclination of the simulated relative value of $I(\lambda, z)$ is about the same as the inclination of the measured relative value of $I(\lambda, z)$.

FIG. 7 shows the change of the relative value of $I(\lambda_1, z)$ and $I(\lambda_2, z)$ with the rate of change in the relative-refractive-index-difference $\Delta n$ calculated by the computer simulation. The vertical axis shows an absolute or relative value of $I(\lambda_1, z)$ and $I(\lambda_2, z)$. The horizontal axis shows a rate of change in the relative-refractive-index-difference $\Delta n$ from the reference value of the relative-refractive-index-difference $\Delta n=0.35\%$. The solid line shows the relative value of $I(\lambda_1, z)$ for $\lambda_1=1310$ nm, and the broken line shows the relative value of $I(\lambda_2, z)$ for $\lambda_2=1550$ nm.

It can be recognized from FIG. 7 that if the rate of change in the relative-refractive-index-difference $\Delta n$ is substantially 1.06 or less, that is, substantially 6% or less, the absolute or relative value of $I(\lambda_1, z)$ and $I(\lambda_2, z)$ becomes substantially 0.1 dB or less. If the absolute or relative value of $I(\lambda_1, z)$ is about 0.1 dB or less, the connection loss can be detected by the OTDR measurement from only one end of an optical fiber. When the relative-refractive-index-difference $\Delta n$ fluctuates and the core diameter does not fluctuate, $|I(\lambda_2)|$ becomes larger than $|I(\lambda_1)|$. It can also be recognized from FIG. 7 that there is a relation between $I(\lambda_1)$ and $I(\lambda_2)$ of $I(\lambda_1) \approx 0.8 \times I(\lambda_2)$ when $\lambda_1$ is 1310 nm and $\lambda_2$ is 1550 nm.

Therefore, the glass base material or the optical fiber is manufactured such that the rate of change in the relative-refractive-index-difference $\Delta n$ is substantially 6% or less, then the transmission loss in the optical fiber can be detected by the OTDR measurement from only one end of an optical fiber. Furthermore, the cause of the transmission loss can be detected by comparing the magnitude of $|I(\lambda_1)|$ and $|I(\lambda_2)|$.

Figure 8:
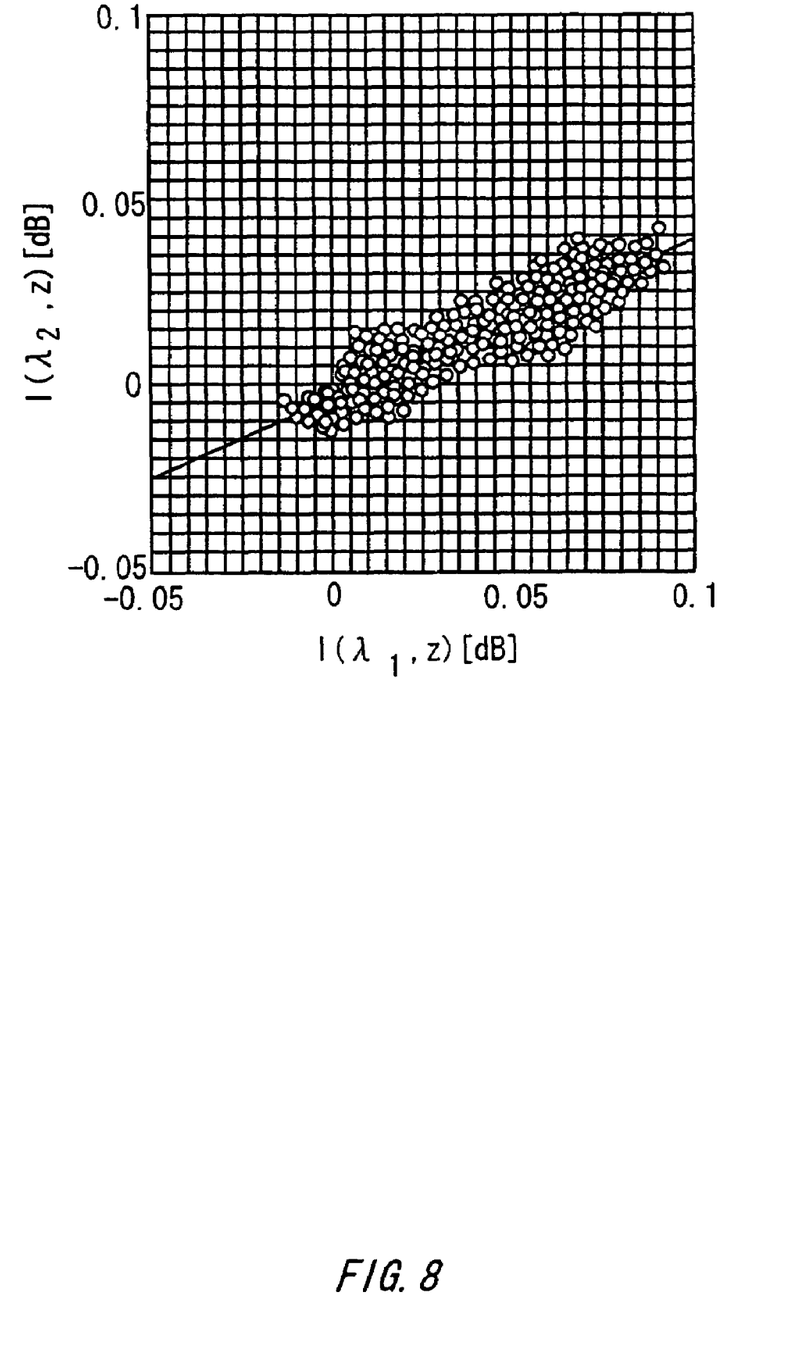
FIG. 8 shows measured values of $I(\lambda_1, z)$ and $I(\lambda_2, z)$.
Figure 9:
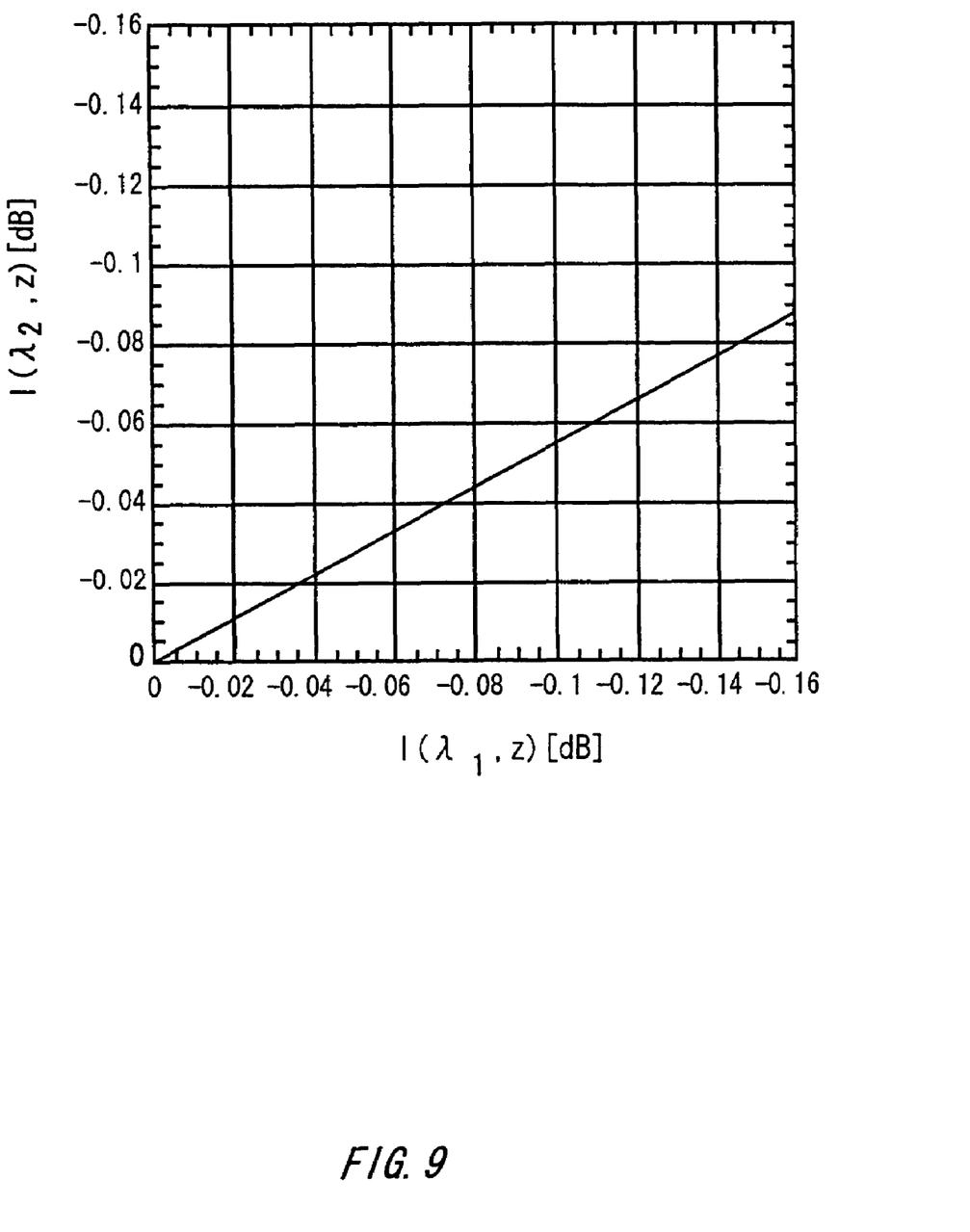
FIG. 9 shows calculated relative values of $I(\lambda_1, z)$ and $I(\lambda_2, z)$.
Figure 10:
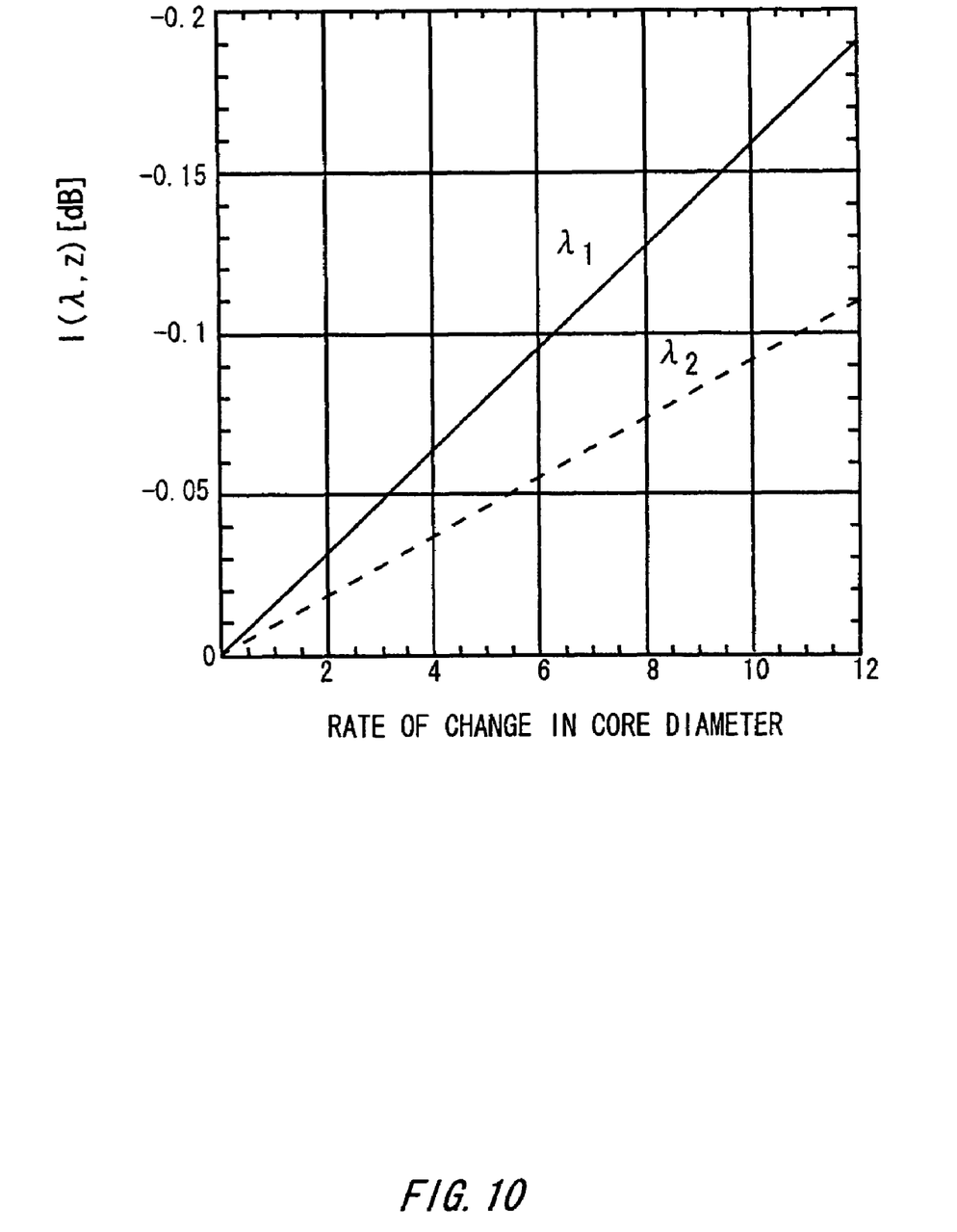
FIG. 10 shows a change of absolute or relative value of $I(\lambda_1, z)$ and $I(\lambda_2, z)$.

FIGS. 8 to 10 show the result of this OTDR measurement performed on the optical fiber manufactured from the glass base material. This glass base material was manufactured such that the outside diameter of the glass base material was fluctuated by the surface treatment using hydrofluoric acid. Then, the glass base material was drawn to have an outside diameter of 125 μm. Then, the optical fiber having the core diameter, which was fluctuated from a central value of 8 μm, was obtained. The OTDR measurement was performed on this optical fiber.

FIG. 8 shows measured values of $I(\lambda_1, z)$ and $I(\lambda_1, z)$. Similar to FIG. 5, the amount of change in the backscattering-light-collect-coefficient $I(\lambda, z)$ is measured for the two wavelengths $\lambda_1=1310$ nm and $\lambda_{2=1550}$ nm varying the position "z" along a longitudinal direction of the optical fiber. Then, the measured values of $I(\lambda_1, z)$ and $I(\lambda_1, z)$ are plotted as in FIG. 8.

Next, the value of the electrical field distribution $\phi$ of the optical fiber, which had a core diameter of 8 μm, was calculated by the computer simulation. During the calculation of the electrical field distribution $\phi$, the relative-refractive-index-difference $\Delta n$ was slightly fluctuated from a reference value of the relative-refractive-index-difference $\Delta n=0.35\%$.

Then, the backscattering-light-collect-coefficient B was calculated using the above-mentioned equation (7). Next, the value of $I(\lambda, z)$ is calculated using the equation (6). Finally, an absolute or relative value of $I(\lambda, z)$ is calculated by calculating a difference between the I(λ, z), which is calculated using the fluctuated core diameter, and the reference I(λ, z), which is calculated using the core diameter of 8 μm.

FIG. 9 shows relative values of I($\lambda_1$, z) and I($\lambda_2$, z) for $\lambda_1$=1310 nm and $\lambda_2$=1550 nm calculated by the computer simulation. It is clear from FIGS. 8 and 9 that the inclination of the simulated relative value of I(λ, z) shown in FIG. 9 is about the same as the inclination of the measured relative value of I(λ, z) shown in FIG. 8.

FIG. 10 shows a change of absolute or relative value of I($\lambda_1$, z) and I($\lambda_2$, z) with the rate of change in the core diameter calculated by the computer simulation. The vertical axis shows an absolute or relative value of I($\lambda_1$, z) and I($\lambda_2$, z). The horizontal axis shows a rate of change in the core diameter from the reference value of the core diameter of 8 μm. The solid line shows the change of relative value of I($\lambda_1$, z) for $\lambda_1$=1310 nm, and the broken line shows the change of relative value of I($\lambda_2$, z) for $\lambda_2$=1550 nm.

It can be recognized from FIG. 10 that if the rate of change in the core diameter is about 1.07 or less, that is, substantially 7% or less, the absolute or relative value of |I($\lambda_1$, z)| and |I($\lambda_2$, z)| become substantially 0.1 dB or less. When the relative-refractive-index-difference Δn does not fluctuate, and the core diameter fluctuates, |I($\lambda_1$)| becomes larger than |I($\lambda_2$)|. It can also be recognized from FIG. 10 that there is a relation between I($\lambda_1$) and I($\lambda_2$) such that I($\lambda_1$)≈2×I($\lambda_2$) when $\lambda_1$ is 1310 nm and $\lambda_2$ is 1550 nm.

Therefore, the glass base material or the optical fiber is manufactured such that the rate of change in the core diameter is substantially 7% or less. Then, the transmission loss in the optical fiber can be detected by the OTDR measurement from only one end of an optical fiber. Furthermore, the cause of the transmission loss can be detected by comparing the magnitude of the absolute or relative values of |I($\lambda_1$, z)| and |I($\lambda_2$, z)|.

For example, if |I($\lambda_2$)| is larger than |I($\lambda_1$)|, the cause of the fluctuation in B is the fluctuation in the relative-refractive-index-difference Δn. Also, if |I($\lambda_1$)| is larger than |I($\lambda_2$)|, the cause of the fluctuation in B is the fluctuation in the core diameter.

Figure 11:
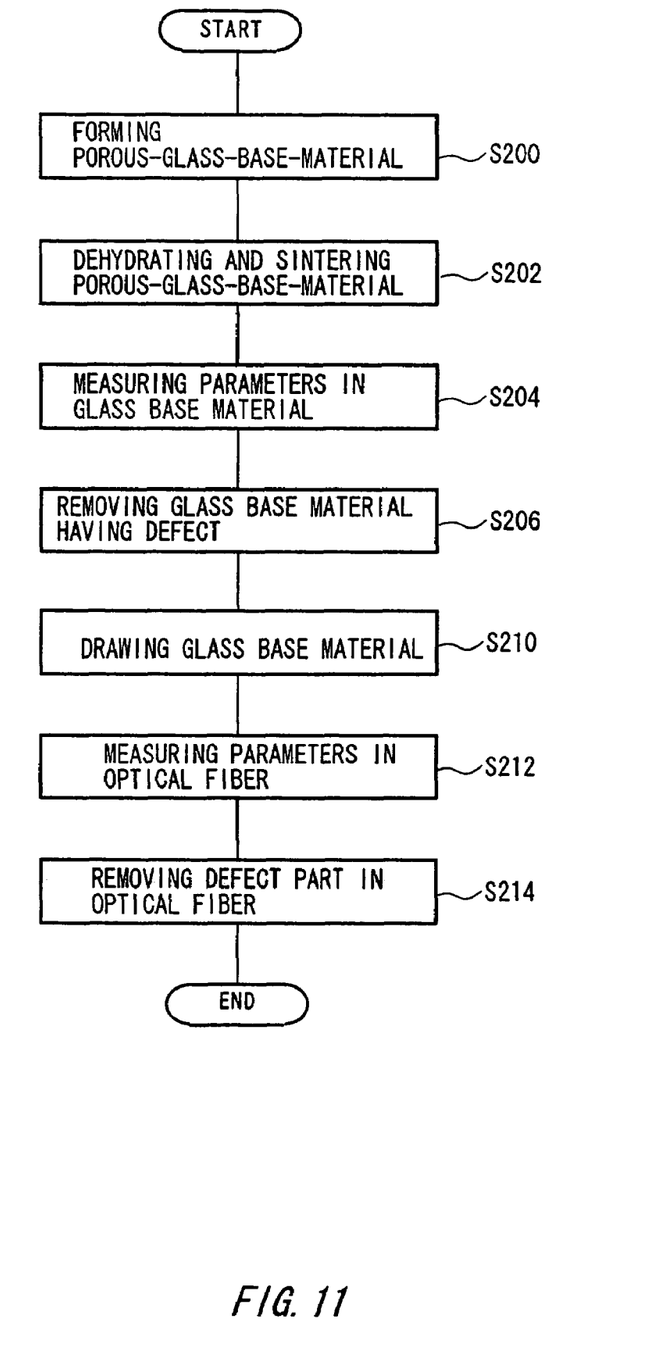
FIG. 11 shows a flowchart of the manufacturing process of the optical fiber using the present embodiment.

FIG. 11 shows a flowchart of the manufacturing process of the optical fiber using the present embodiment. First, a porous-glass-base-material is formed by forming a clad around a core by accumulating glass particles on the core (S200). Next, a glass base material is formed by sintering and dehydrating the porous-glass-base-material (S202).

Then, the parameters of the glass base material are measured (S204). As examples of the parameters, there is a rate of change in a relative-refractive-index-difference in a longitudinal direction of the glass base material and the rate of change in the core diameter in a longitudinal direction of the glass base material.

Then, the glass base material that has the defect part, in which the rate of change in a relative-refractive-index-difference is more than substantially 6%, is removed from the manufacturing process of the optical fiber. Also, the glass base material that has the part, in which the rate of change in the core diameter is more than substantially 7% is removed from the manufacturing process of the optical fiber (S206). Next, the glass base material is drawn into an optical fiber (S210).

Then, the parameters of the optical fiber are measured (S212). As examples of the parameters, there is a rate of change in a relative-refractive-index-difference in a longitudinal direction of the optical fiber and the rate of change in the core diameter in a longitudinal direction of the optical fiber.

The cause of defect in an optical fiber can be determined as following. First, the backscattering-light-strengths S($\lambda_1$, z) and S($\lambda_2$, z) of the optical fiber for two wavelengths $\lambda_1$ and $\lambda_2$, where $\lambda_1 < \lambda_2$ are measured from both ends of the optical fiber. Then, an amount of change in the backscattering-light-collect-coefficients I($\lambda_2$, z) and I($\lambda_1$, z) for the two wavelengths $\lambda_1$ and $\lambda_2$ are calculated. Then, the amount of change in the backscattering-light-collect-coefficients I($\lambda_1$, z) and I($\lambda_2$, z) for the two wavelengths $\lambda_1$ and $\lambda_2$ are compared to examine whether the amount of change in the backscattering-light-collect-coefficients I($\lambda_1$, z) and I($\lambda_2$, z) satisfy a predetermined relationship.

For example, in this comparing process, whether the amount of change in the backscattering-light-collect-coefficients I($\lambda_1$, z) and I($\lambda_2$, z) satisfy a relationships of |I($\lambda_1$, z)|>0.1 dB, |I($\lambda_2$, z)|>0.1 dB, and |I($\lambda_1$, z)|<|I($\lambda_2$, z)| in the optical fiber is examined. Then, it is determined that the cause of defect is in a rate of change in a relative-refractive-index-difference of the optical fiber in a longitudinal direction when the relationships of |I($\lambda_1$, z)|>0.1 dB and |I($\lambda_2$, z)|>0.1 dB, and |I($l_1$, z)|<|I($\lambda_2$, z)| are satisfied.

Furthermore, in this comparing process, whether the amount of change in the backscattering-light-collect-coefficients I($\lambda_2$, z) and I($\lambda_1$, z) satisfy a relationships of |I($\lambda_1$, z)|>0.1 dB, |I($\lambda_2$, z)|>0.1 dB, and |I($\lambda_1$, z)|>|I($\lambda_2$, z)| in the optical fiber is examined. Then, it is determined that the cause of defect is in a rate of change in a core diameter in longitudinal direction of the optical fiber when the relationship of |I($\lambda_1$, z)|>0.1 dB, |I($\lambda_2$, z)|>0.1 dB, and |I($\lambda_1$, z)|>|I($\lambda_2$, z)| are satisfied.

Then, the defect part of the optical fiber, in which the rate of change in a relative-refractive-index-difference in a longitudinal direction of the optical fiber is more than substantially 6%, is removed from the manufacturing process of the optical fiber. Also, the optical fiber that has the part, in which the rate of change in the core diameter is more than substantially 7%, is removed from the manufacturing process of the optical fiber (S214).

Therefore, according to the above-explained process, an optical fiber having an absolute or relative value of |I(λ, z)|, which is substantially 0.1 dB or less, can be obtained. Therefore, it becomes possible to specify the part, in which the transmission loss is occurred, by measuring the backscattering-light-strength S(λ, z) from only one end of the optical fiber.

Although the present invention has been described by way of exemplary embodiments, it should be understood that many changes and substitutions may be made by those skilled in the art without departing from the spirit and the scope of the present invention which is defined only by the appended claims.

What is claimed is:

1. A method for manufacturing a glass base material which is a base material of an optical fiber, comprising:

forming a clad around a core by accumulating glass particles on said core to form a porous-glass-base-material;

sintering and dehydrating said porous-glass-base-material to form said glass base material;

determining a rate of change in a diameter of said core of said glass base material;

determining a rate of change in a relative-refractive-index-difference between said core and said clad of said glass base material using the equation:

$$\Delta n = \{(n_1 - n_2)/n_1\} \times 100\%$$

Δn being a relative-refractive-index-difference between said core and said clad, $n_1$ being a refractive index of said core and $n_2$ being a refractive index of said clad; and removing all portions of said glass base material defective for use as a base material of an optical fiber where said rate of change in a relative-refractive-index-difference of said removed portions of said glass base material is more than substantially 6% or said rate of change in a core diameter is more than substantially 7%, such that a part of the optical fiber subsequently drawn from said glass base material remaining after the defective portions are removed which has a transmission loss more than 0.1 dB is detectable by measuring the incidental light from only one end of said optical fiber using OTDR measurement.

2. A method for manufacturing an optical fiber, comprising:

drawing a glass base material, which is a base material of said optical fiber having a core and a clad that surrounds said core, to form said optical fiber;

determining a rate of change in a core diameter of said optical fiber;

determining a rate of change in a relative-refractive-index-difference between said core and said clad of said optical fiber using the equation:

$$\Delta n = \{(n_1 - n_2)/n_1\} \times 100\%$$

Δn being a relative-refractive-index-difference between said core and said clad, $n_1$ being a refractive index of said core and $n_2$ being a refractive index of said clad; and removing from said optical fiber all defective portions whose rate of change in a relative-refractive-index-difference is more than substantially 6% or whose rate of change in a core diameter is more than substantially 7%, such that a part of the optical fiber remaining after the defective portions are removed which has a transmission loss of more than 0.1 dB is detectable by measuring the incidental light from only one end of said optical fiber using OTDR measurement.

3. A method for manufacturing a glass base material which is a base material of an optical fiber and for manufacturing the optical fiber therefrom, comprising:

forming a clad around a core by accumulating glass particles on said core to form a porous-glass-base-material;

sintering and dehydrating said porous-glass-base-material to form said glass base material;

determining a rate of change in a diameter of said core of said glass base material;

determining a rate of change in a relative-refractive-index-difference between said core and said clad of said glass base material using the equation:

$$\Delta n = \{(n_1 - n_2)/n_1\} \times 100\%$$

Δn being a relative-refractive-index-difference between said core and said clad, $n_1$ being a refractive index of said core and $n_2$ being a refractive index of said clad;

removing all portions of said glass base material defective for use as a base material of an optical fiber where said rate of change in said diameter of said core of said removed portions of said glass base material are more than substantially 7% or said rate of change in a relative-refractive-index-difference of said removed portions of said glass base material are more than substantially 6%;

drawing the optical fiber from that portion of said glass base material remaining after the defective portions are removed;

determining a rate of change in a diameter of a core of the optical fiber of said optical fiber;

determining a rate of change in a relative-refractive-index-difference between said core and said clad of said optical fiber of said optical fiber; and removing all portions of said optical fiber as defective for use where said rate of change in a relative-refractive-index-difference of said optical fiber is more than substantially 6% or said rate of change in a core diameter of said optical fiber is more than substantially 7%.

4. A method for manufacturing an optical fiber, comprising:

drawing a glass base material, which is a base material of said optical fiber having a core and a clad that surrounds said core, to form said optical fiber;

determining a rate of change in a relative-refractive-index-difference between said core and said clad of said optical fiber using the equation:

$$\Delta n = \{(n_1 - n_2)/n_1\} \times 100\%$$

Δn being a relative-refractive-index-difference between said core and said clad, $n_1$ being a refractive index of said core and $n_2$ being a refractive index of said clad;

determining a rate of change in a core diameter of said optical fiber; and removing as defective from said optical fiber all portions whose rate of change in said core diameter is more than substantially 7% or whose rate of change in a relative-refractive-index-difference is more than substantially 6%.

5. A method for manufacturing a glass base material which is a base material of an optical fiber, comprising:

forming a clad around a core by accumulating glass particles on said core to form a porous-glass-base-material;

sintering and dehydrating said porous-glass-base-material to form said glass base material determining a rate of change in a diameter of said core of said glass base material;

determining a rate of change in a relative-refractive-index-difference between said core and said clad of said glass base material using the equation:

$$\Delta n = \{(n_1 - n_2)/n_1\} \times 100\%$$

Δn being a relative-refractive-index-difference between said core and said clad, $N_1$ being a refractive index of said core and $n_2$ being a refractive index of said clad; and removing all portions of said glass base material defective for use as a base material of an optical fiber where said rate of change in a relative-refractive-index-difference of each of said removed portions of said glass base material is more than substantially 6% or said rate of change in a core diameter is more than substantially 7%, such that an absolute or relative value of an amount of change in the backscattering-light-collect-coefficient is about 0.1 dB or less in the optical fiber subsequently drawn from said glass base material remaining after the defective portions are removed.

* * * * *